(12) United States Patent
Cho

(10) Patent No.: US 8,055,267 B2
(45) Date of Patent: Nov. 8, 2011

(54) SYSTEM AND METHOD FOR ALLOCATING RESOURCE AND USER TERMINAL

(75) Inventor: Sung-woo Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 845 days.

(21) Appl. No.: 11/513,045

(22) Filed: Aug. 31, 2006

(65) Prior Publication Data

US 2007/0116010 A1    May 24, 2007

(30) Foreign Application Priority Data

Nov. 22, 2005   (KR) .......................... 10-2005-0111868

(51) Int. Cl.
*H04W 72/00* (2009.01)

(52) U.S. Cl. ..................... 455/452.2; 455/450; 455/451; 455/453; 455/509; 455/9; 370/315; 370/320; 370/329; 370/332

(58) Field of Classification Search ............... 455/452.2, 455/450–453, 405–409, 509, 9, 11.1; 370/329–332, 370/339, 315, 320
See application file for complete search history.

(56) References Cited

U.S. PATENT DOCUMENTS

| | | | | |
|---|---|---|---|---|
| 5,583,869 A * | 12/1996 | Grube et al. | .................. | 370/347 |
| 6,600,903 B1 * | 7/2003 | Lilja et al. | .................. | 455/67.11 |
| 6,671,511 B1 * | 12/2003 | Forssell et al. | ............. | 455/452.1 |
| 7,149,486 B2 * | 12/2006 | Kurose | ........................ | 455/226.2 |
| 7,320,131 B1 * | 1/2008 | O'Toole, Jr. | .................. | 718/104 |
| 7,652,989 B2 * | 1/2010 | Yang et al. | ..................... | 370/230 |
| 7,684,806 B2 * | 3/2010 | Ovadia et al. | ................. | 455/450 |
| 2002/0072384 A1 * | 6/2002 | Chheda | ......................... | 455/522 |
| 2002/0120744 A1 * | 8/2002 | Chellis et al. | ................. | 709/226 |

FOREIGN PATENT DOCUMENTS

| | | |
|---|---|---|
| DE | 103 09 618 A1 | 9/2004 |
| EP | 0 986 282 A1 | 3/2000 |
| EP | 1 217 858 A1 | 6/2002 |
| GB | 2 347 317 A | 8/2000 |
| JP | 11-298631 A | 10/1999 |
| JP | 2002271847 A | 9/2002 |
| JP | 2004032077 A | 1/2004 |
| JP | 2004153619 A | 5/2004 |

OTHER PUBLICATIONS

Office Action dated Jun. 29, 2010 from the Japanese Patent Office in Japanese counterpart application No. 2006-315566.

* cited by examiner

*Primary Examiner* — Rafael Pérez-Gutiérrez
*Assistant Examiner* — Lameka Kirk
(74) *Attorney, Agent, or Firm* — Sughrue Mion, PLLC

(57) ABSTRACT

A system for allocating resources, including at least one user terminal operable to determine at least one resource needed by the user terminal and further operable to request a first allocation of the resource. A relaying apparatus is provided which is operable to determine the resource to be allocated and further operable to transmit the determined resource to the user terminal. The user terminal is operable to calculate a cost of the resource allocated by the relaying apparatus, compare the cost with a predetermined reference value based on a changed need for the resource, and further operable to request a second allocation of the resource to the relaying apparatus based on the changed need for the resource.

19 Claims, 2 Drawing Sheets

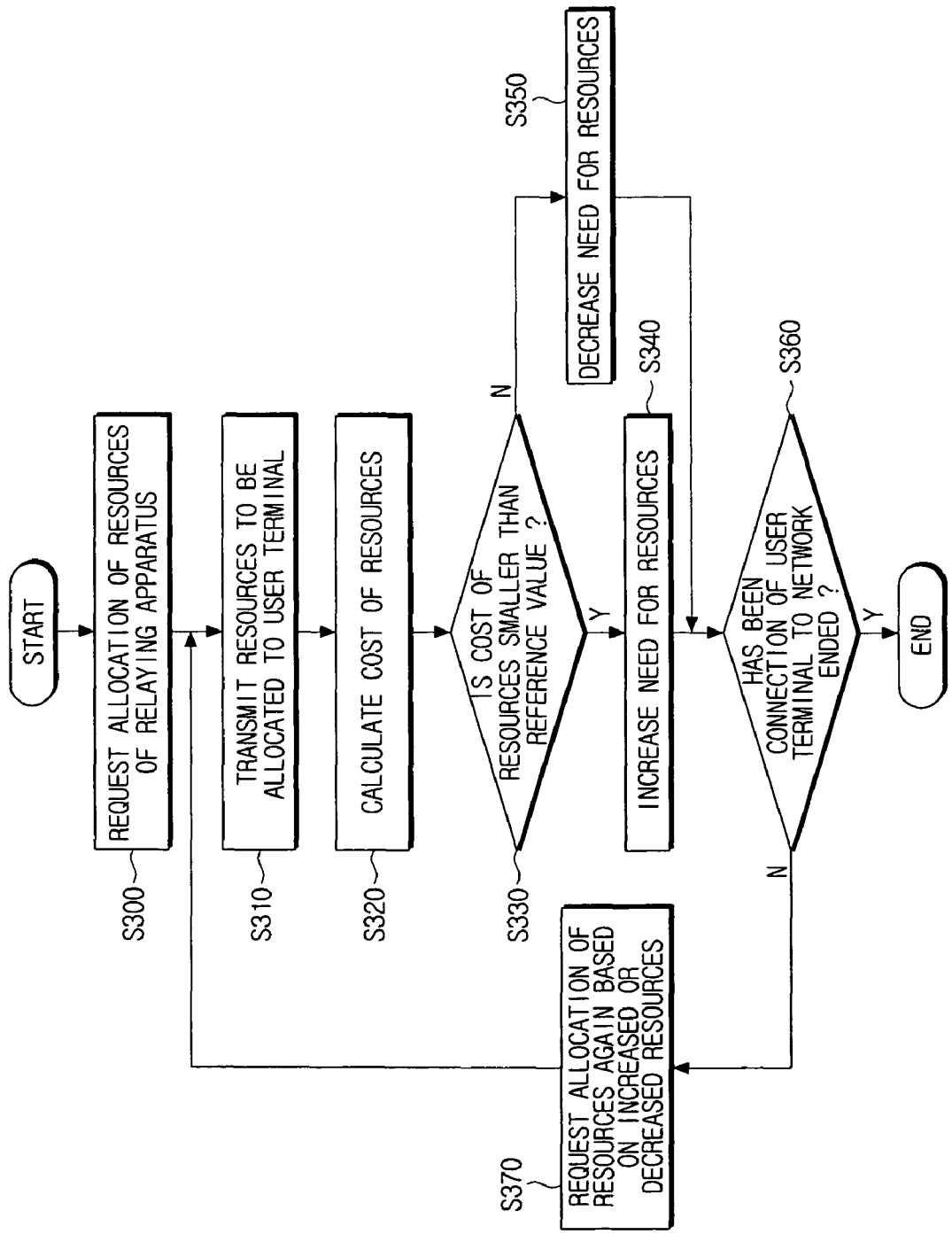

SYSTEM AND METHOD FOR ALLOCATING RESOURCE AND USER TERMINAL

CROSS-REFERENCE TO RELATED APPLICATIONS

This application claims the benefit of Korean Patent Application No. 2005-111868, filed Nov. 22, 2005, in the Korean Intellectual Property Office, the disclosure of which is incorporated herein by reference.

BACKGROUND OF THE INVENTION

1. Field of the Invention

The present invention relates to techniques for allocating resources to a user terminal. More particularly, techniques for allocating resources by which a user terminal can control energy and performance thereof during an allocation of resources to the user terminal.

2. Description of the Related Art

Wireless communications relate to technology using electric waves as transmission media of information. Wireless communication systems can easily transmit information regardless of positions of users and thus have gradually expanded their application ranges. Wireless terminals of the wireless communication systems are mobile, portable, and convenient.

Wireless communications can be classified into first generation and second generation. The first generation wireless communications relate to services used in analog wireless terminals in initial wireless communications. The second generation wireless communications relate to services used in digital wireless terminals following the analog wireless terminals. IMT-2000 services recently called next generation mobile communications are referred to as third generation wireless communications. Services providing high quality Internet services through one wireless terminal at a low cost after the third generation wireless communications are referred to as fourth generation wireless communications.

In the first and second generation wireless communications, concepts of fairness of throughput and energy of communication lines transmitting data are not considered. However, resource management algorithms are applied starting from the third generation wireless communications. The resource management algorithms introduce fairness of energy and provide a high transmission rate in the same bandwidth.

However, when the resource management algorithms are applied to third generation wireless communication systems, access points (APs) must know about utility functions of a plurality of wireless terminals, for example, types, protocols, and Quality of Service (QoS), in advance.

The fourth generation wireless communications after the third generation wireless communications relate to ubiquitous and heterogeneous mobile networks. In the fourth generation wireless communications, various types of wireless terminals or different types of networks are connected to one another to interact with one another. Thus, it is not easy to grasp the characteristics of the various types of wireless terminals and there are no methods for allocating resources considering the energy usage of the various types of wireless terminals.

Also, in the fourth generation wireless communications, users do not stay in one type of network but can select desired one of various types of network. Thus, it is difficult to secure compatibility among the various standards used by the respective networks.

As described above, wireless communications have been developed from first and second generation wireless communications to third and fourth generation wireless communications. However, attempts to reduce an amount of energy used by a plurality of wireless terminals result in deterioration of speeds of communication lines due to problems in managing resources of the plurality of wireless terminals. Also, the total amount of energy used increases with an increase in the speeds of the communication lines.

SUMMARY OF THE INVENTION

The present invention aims to solve some of the above-mentioned disadvantages and/or problems. An aspect of the present general inventive concept is to provide techniques for allocating resources by which a user terminal can selectively change a need for resources to request a second allocation of resources based on a changed need for resources so as to control energy and performance by itself, and the user terminal.

According to an aspect of the present invention, there is provided a system for allocating resources, including at least one user terminal operable to determine at least one resource needed by the user terminal and further operable to request a first allocation of the resource. A relaying apparatus is provided which is operable to determine the resource to be allocated and further operable to transmit the determined resource to the user terminal. The user terminal is operable to calculate a cost of the resource allocated by the relaying apparatus, compare the cost with a predetermined reference value based on a changed need for the resource, and further operable to request a second allocation of the resource to the relaying apparatus based on the changed need for the resource.

The relaying apparatus may be an AP (access point) or a BS (base station).

If the costs are smaller than the reference value, the plurality of user terminals may increase the need for resources, and if the costs are larger than the reference value, the plurality of user terminals may decrease the need for resources.

According to another aspect of the present invention, there is provided a method for allocating resources in a system comprising the user terminal, determining at least one resource needed by the user terminal. A first allocation of the resource is made to a relaying apparatus. The relaying apparatus determines the resource to be allocated. The determined resource is transmitted to the user terminal. The user terminal calculates cost of the resource allocated by the relaying apparatus. The cost is compared with a reference value based on a changed need for the resource. The user terminal requests a second allocation of the resource based on the changed need.

The relaying apparatus may be an AP or a BS.

In the operation of changing the need for resources, if the costs are smaller than the predetermined reference value, the need for resources may be increased, and if the costs are larger than the predetermined reference value, the need for resources may be decreased.

According to another aspect of the present invention, there is provided a user terminal including a needful resource determiner operable to determine need for resources. A network interface is provided which is operable to request an allocation of the resources to a relaying apparatus based on the determined need for the resources and operable to receive the allocated resources from the relaying apparatus. A controller is provided which is operable to control the network interface and to calculate costs of the resources allocated by the relaying apparatus, and further operable to compare the costs with a predetermined reference value to change the need for the resources, and further operable to request a second allocation of the resources to the relaying apparatus based on the changed need.

The needful resource determiner may determine the needful resources $x_i$ using Equation below:

$$x_i = \frac{\min_e C_e}{2n}$$

wherein $\min_e C_e$ denotes minimum capacity of possible connection paths between the relaying apparatus and a plurality of user terminals, and n denotes a number of the plurality of user terminals connected to the relaying apparatus.

The controller may calculate the costs $w_i$ of the resources using Equation below:

$$W_i = \Sigma_{e \in p_i} l_e$$

wherein $l_e$ denotes a cost value given to a path e, and $p_i$ denotes a set of paths used terminal i.

If the costs are smaller than the predetermined reference value, the controller may increase the need for the resources, and if the costs are larger than the predetermined reference value, the controller may decrease the need for the resources.

The controller may determine the increased need for the resources $x_{i1}$ using Equation below:

$$x_{i1}(t) = x_i(t-1)\left(1 + \frac{1}{\delta}\right)$$

wherein $x_i$ denotes need for resources that have not been changed, and δ denotes a variable value set according to characteristics of the user terminal, the relaying apparatus, and a channel state between the user terminal and the relaying apparatus.

The controller may determine the decreased need for the resources $X_{i2}$ using Equation below:

$$x_{i2}(t) = x_i(t-1)\left(1 - \frac{1}{\delta}\right)$$

wherein $x_i$ denotes need for resources that have not been changed, and δ denotes a variable value set according to characteristics of the user terminal, the relaying apparatus, and a channel state between the user terminal and the relaying apparatus.

The user terminal may further include a DRC (data request control) generator generating a DRC message to be transmitted to the relaying apparatus based on the needful resources determined by the needful resource determiner and the need fol resources changed by the controller.

BRIEF DESCRIPTION OF THE DRAWINGS

The above aspects and features of the present invention will be more apparent by describing certain embodiments of the present invention with reference to the accompanying drawings, in which:

FIG. 3 is a flowchart of a method for allocating resources according to an exemplary embodiment of the present invention.

DETAILED DESCRIPTION OF THE EMBODIMENTS

Figure 1:
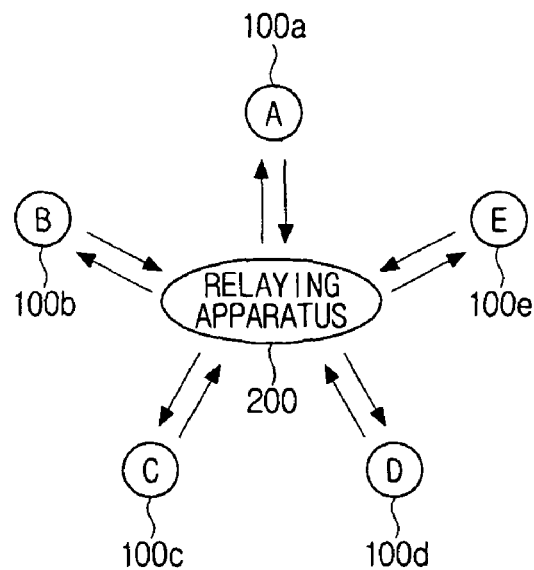
FIG. 1 is a schematic view of a system for allocating resources according to an exemplary embodiment of the present invention.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a schematic view of a system for allocating resources according to an exemplary embodiment of the present invention. Referring to FIG. 1, the system includes a relaying apparatus 200 and a plurality of user terminals A through E (100a through 100e) connected to the relaying apparatus 200.

The relaying apparatus 200 receives resource allocation requests from the plurality of user terminals A through E (100a through 100e) and allocates network resources to the plurality of user terminals A through E (100a through 100e).

In other words, if one of the plurality of user terminals A through E (100a through 100e) requests for an allocation of resources, the relaying apparatus 200 determines resources to be allocated to the corresponding user terminal and transmits the resources to the corresponding user terminal.

The relaying apparatus 200 may an Access Point (AP) or a base station (BS). In general, the AP is one of apparatuses constituting a wireless local area network (LAN) and connects a wire LAN to the wireless LAN, and the BS is a wireless station set up to perform communications with a land mobile station or communications by relaying of a mobile relaying station.

The plurality of user terminals A through E (100a through 100e) determine resources that are needed by them. The plurality of user terminals then request the allocations of the resources to the relaying apparatus 200. If the relaying apparatus 200 allocates the resources to the plurality of user terminals A through E (100a through 100e), the plurality of user terminals A through E (100a through 100e) calculate costs of the resources allocated by the relaying apparatus 200. The then change their need for the resources based on the calculated costs, and request allocations of resources of the relaying apparatus 200 again based on the changed need for the resources.

In the described exemplary embodiment, the plurality of user terminals A through E (100a through 100e) are terminals using different types of networks. For example, the user terminals A through C (100a through 100c) may be terminals using wire networks, and the user terminals D through E (100d through 100e) may be terminals using wireless networks.

The plurality of user terminals A through E (100a through 100e) will be described in more detail later with reference to FIG. 2.

Figure 2:
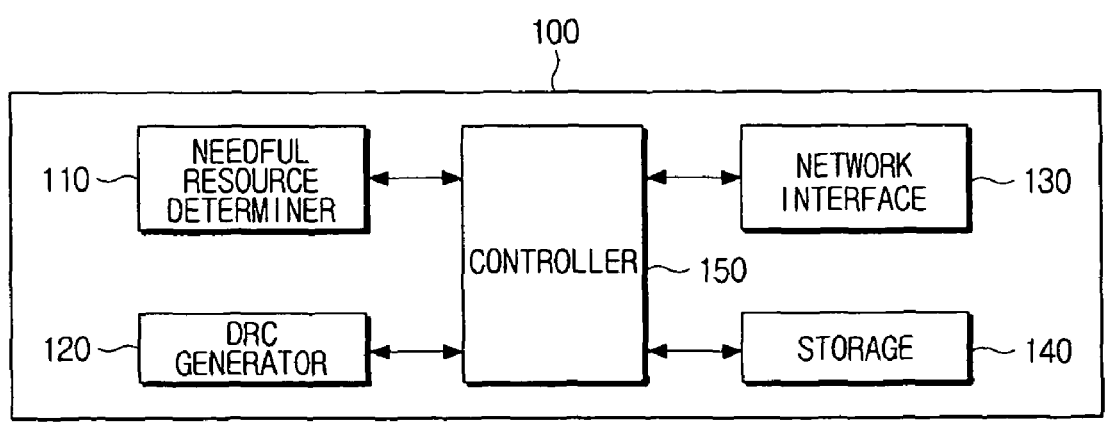
FIG. 2 is a block diagram of a user terminal according to an exemplary embodiment of the present invention.

FIG. 2 is a block diagram of a user terminal according to an exemplary embodiment of the present invention. Referring to FIG. 2, a user terminal 100 according to the present exemplary embodiment includes a needful resource determiner 110, a data request control (DRC) generator 120, a network interface 130, a storage 140, and a controller 150. Here, the user terminal 100 is one of the plurality of user terminals A through E (100a through 100e).

The needful resource determiner 110 determines initial need for the resources to be requested from the relaying apparatus 200. The needful resource determiner 110 may determine need for resources $x_i$ as in Equation: 1:

$$x_i(0) = \frac{\min_e C_e}{2n} \quad (1)$$

wherein $\min_e C_e$ denotes minimum capacity of possible connection paths between the relaying apparatus 200 and the plurality of user terminals A through E (100a through 100e), and n denotes a number of the plurality of user terminals A through E (100a through 100e) connected to the relaying apparatus 200.

The need for resources determined by the needful resource determiner 110 may be values using Equation 1 or may be pre-set values that do not need to be calculated whenever requesting for allocations of resources.

The needful resource determiner 110 may determine the need for resources $x_i$ using an algorithm below.
Distributed-Majorization( )

```
1    /*******Initialization*******/
2    δ=12lnρ+2
3    for each edge e
4          do  l_e(0) = δ/(2ρ^3)
5    for each flow i
6          do  x_i(0) = min_e C_e / 2n
7    t=0
8    /*******Distributed Improvement*******/
9    while TRUE
10         do t=t+1
11            /*******bandwidth allocation*******/
12            for each flow i s.t. w_i(t) < 1
13               do  x_i(t) = x_i(t-1)(1 + 1/δ)
14            for each flow i s.t. w_i(t) ≧ 1
15               do  x_i(t) = x_i(t-1)(1 - 1/δ)
16            /*******edge-length update*******/
17            for each edge e
18               do  l_e(t) = l_e(t-1)(1 + δΔΛ_e(t-1))
```

In the algorithm, e is only one path existing between the relaying apparatus 200 and the plurality of user terminals A through E (100a through 100e). $C_e$ is a capacity of a user terminal on the path e, $l_e(t)$ is cost given to the path e for a time t, and $x_i(t)$ is resources allocated to a user terminal i for the time t. Also, $W_i(t)$ is a sum of costs the user terminal i must play for the time t, i.e., a sum of costs the user terminal i pays for all resources. $\Delta\Lambda_e(t)$ is a value obtained by subtracting resources using the path e for a time t−1 from resources using the path e for the time t. Also, $$\rho = \max\left(m, n, \frac{\max_e C_e}{\min_e C_e}\right),$$

m denotes a number of paths, and n denotes a number of the plurality of user terminals A through E (100a through 100e) connected to the relaying apparatus 200.

The DRC generator 120 generates a DRC message to be transmitted to the relaying apparatus 200 based on the need for resources determined by the needful resource determiner 110.

If the controller 150 that will be described later changes the need for resources, the DRC generator 120 also generates the DRC message to be transmitted to the relaying apparatus 200 based on the changed need for the resources.

The DRC message generated by the DRC generator 120, i.e., based on the need for resources determined by the needful resource determiner 110 and the need for resources changed by the controller 150, is transmitted through the network interface 130 that will be described later to the relaying apparatus 200.

The network interface 130 supports an interface between the user terminal 100 and a network so as to connect the user terminal 100 to the relaying apparatus 200.

The storage 140 stores various pre-set values used by the controller 150. In other words, the storage 140 may store a reference value β used as a reference for comparing costs and a variable value δ set according to the characteristic of the user terminal 100.

The controller 150 controls the overall function of the user terminal 100. In other words, the controller 150 controls inputs and outputs of signals among the needful resource determiner 110, the DRC generator 120, the network interface 130, and the storage 140.

If the relaying apparatus 200 allocates resources, the controller 150 calculates costs of the allocated resources. The controller 150 may calculate a cost $W_i$ of the resources allocated by the relaying apparatus 200 using Equation 2:

$$W_i = \Sigma_{e \epsilon p_i} l_e \quad (2)$$

wherein $l_e$ denotes a cost value given to the path e, and $p_i$ denotes a set of paths used by the user terminal i.

The controller 150 compares the calculated cost $W_i$ with a predetermined reference value 1 to change the need for resources determined by the needful resource determiner 110 according to the comparison result.

If the cost $W_i$ is smaller than the predetermined reference value 1, the controller 150 increases the need for resources the controller 150 has requested of the relaying apparatus 200. If the cost $W_i$ is larger than the predetermined reference value 1, the controller 150 decreases the need for resources.

Here, the controller 150 determines the increased need for resources $x_{i1}$ or the decreased need for resources $x_{i2}$ using—Equation 3:

$$x_{i1}(t) = x_i(t-1)\left(1 + \frac{1}{\delta}\right)$$

$$x_{i2}(t) = x_i(t-1)\left(1 - \frac{1}{\delta}\right) \quad (3)$$

wherein $x_i$ denotes need for resources that have not been changed, and δ denotes a variable value set according to the characteristics of the user terminal 100, the relaying apparatus 200, and a channel state between the user terminal 100 and the relaying apparatus 200.

After the controller 150 determines the increased need for resources $x_{i1}$ or the decreased need for resources $x_{i2}$ using—Equation 3, the controller 150 controls the DRC generator 120 to generate the DRC message based on the increased need for resources $x_{i1}$ or the decreased need for resources $x_{i2}$.

The controller 150 controls the network interface 130 to transmit the DRC message generated by the DRC generator 120 to the relaying apparatus 200 so as to request allocations of resources again based on the changed need for resources.

FIG. 3 is a flowchart of a method for allocating resources according to an exemplary embodiment of the present invention. The method will be described with reference to FIGS. 1 through 3.

In operation S300, the user terminal 100 requests an allocation of resources of the relaying apparatus 200. In other words, the DRC generator 120 generates a DRC message based on need for resources determined by the needful resource determiner 110 using Equation 1 above and transmits the DRC message through the network interface 130 to the relaying apparatus 200 so as to request the allocation of the resources.

In operation S310, the relaying apparatus 200 determines resources to be allocated to the user terminal 100 and transmits the determined resources to the user terminal 100.

In operation S320, the user terminal 100 calculates a cost of the allocated resources. In other words, the controller 150 calculates the cost of the resources using Equation 2 above.

In operation S330, the controller 150 of the user terminal 100 compares the cost with a reference value stored in the storage 140 so as to change the need for resources according to the comparison result.

If it is determined in operation S330 that the cost is smaller than the reference value, the controller 150 of the user terminal 100 increases the need for resources the controller 150 has requested of the relaying apparatus 200 in operation S340. Here, the increased need for resources is calculated using Equation 3 above.

If it is determined in operation S330 that the cost is larger than the reference value, the controller 150 of the user terminal 100 decreases the need for resources the controller 150 has requested of the relaying apparatus 200 in operation S350. Here, the decreased need for resources is calculated using Equation 3 above.

If a connection of the controller 150 of the user terminal 100 to the relaying apparatus 200 through the network interface 130 is not ended, the controller 150 requests an allocation of resources of the relaying apparatus 200 based on the changed need for resources. In other words, the controller 150 controls the DRC generator 120 to generate a DRC message based on the changed need for resources and controls the network interface 130 to transmit the DRC message to the relaying apparatus 200 in operations S360 and 370.

This process is repeatedly performed until the connection of the user terminal 100 to the relaying apparatus 200 is ended in operation S360.

As described above, in a system and a method for allocating resources and a user terminal according to the present invention, the user terminal can determine need for resources thereof to request an allocation of resources. Also, the user terminal can actively change the need for resources to request an allocation of resources again so as to control energy and performance and save energy.

Also, fairness among heterogeneous user terminals can be secured. Thus, the heterogeneous user terminals can be applied to innumerable network standards, and all functions can be performed in the heterogeneous user terminals. As a result, standards of a relaying apparatus do not need to be modified.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A system for allocating resources, comprising:
   at least one user terminal operable to determine at least one resource needed by the user terminal and further operable to request a first allocation of the resource; and
   a relaying apparatus operable to determine the resource to be allocated and further operable to transmit the determined resource to the user terminal,
   wherein the user terminal is operable to calculate a cost of the resource allocated by the relaying apparatus, compare the cost with a prestored predetermined reference value, to change the need for the resource based on the comparison result, and to request the relaying apparatus for a second allocation of the resource based on the changed need for the resource, and
   wherein the relaying apparatus determines the resource to be allocated to the user terminal using the number of a plurality of user terminals connected to the relaying apparatus.

2. The system of claim 1, wherein the relaying apparatus is one of an access point and a base station.

3. The system of claim 1, wherein if the cost is smaller than the reference value, the user terminal is operable to increase the need for the resource.

4. The system of claim 1, wherein if the cost is larger than the reference value, the user terminal is operable to decrease the need for the resource.

5. The system of claim 1, wherein the resource is the resource of the relying apparatus.

6. The system of claim 1, wherein a plurality of user terminals are connected to the relaying apparatus.

7. A method for allocating resources in a system having at least one user terminal connected to a relaying apparatus, the method comprising:
   the user terminal, determining at least one resource needed by the user terminal;
   requesting a relaying apparatus for a first allocation of resource;
   the relaying apparatus, determining the resource to be allocated;
   transmitting the determined resource to the user terminal;
   the user terminal, calculating cost of the resource allocated by the relaying apparatus;
   comparing the cost with a prestored predetermined reference value; and changing the need for the resource based on a comparison result; and
   the user terminal, requesting a second allocation of the resource based on the changed need,
   wherein the relaying apparatus determines the resource to be allocated to the user terminal using the number of a plurality of user terminals connected to the relaying apparatus.

8. The method of claim 7, wherein the relaying apparatus is one of an AP and a BS.

9. The method of claim 7, wherein if the cost is smaller than the predetermined reference value, the need for the resource is increased.

10. The method of claim 7, wherein if the cost is larger than the predetermined reference value, the need is decreased.

11. The method of claim 7, wherein the resource is a resource of the relying apparatus.

12. The method of claim 7, wherein a plurality of user terminals are connected to the relaying apparatus.

13. A user terminal comprising:
   a needful resource determiner operable to determine need for resources;

a network interface operable to request a relaying apparatus for an allocation of the resources based on the determined need for the resources and operable to receive the allocated resources from the relaying apparatus; and a controller operable to control the network interface and to calculate costs of the resources allocated by the relaying apparatus, to compare the costs with a prestored reference value to change the need for the resources based on comparison result, and to request the relaying apparatus for a second allocation of the resources based on the changed need, wherein the needful resource determiner determines the need for the resources using the number of a plurality of user terminals connected to the relaying apparatus.

14. The user terminal of claim 13, wherein the needful resource determiner determines the need for the resources $x_i$ using Equation below:

$$x_i = \frac{\min_e C_e}{2n}$$

wherein $\min_e C_e$ denotes minimum capacity of possible connection paths between the relaying apparatus and a plurality of user terminals, and n denotes the number of the plurality of user terminals connected to the relaying apparatus.

15. The user terminal of claim 13, wherein the controller calculates the costs $w_i$ of the resources using Equation below:

$$w_i = \Sigma_{e \in p_i} l_e$$

wherein $l_e$ denotes a cost value given to a path e, and $p_i$ denotes a set of paths used terminal i.

16. The user terminal of claim 13, wherein if the costs are smaller than the predetermined reference value, the controller increases the needful resources, and if the costs are larger than the predetermined reference value, the controller decreases the needful resources.

17. The user terminal of claim 16, wherein the controller determines the increased needful resources $x_{i1}$ using Equation below:

$$x_{i1}(t) = x_i(t-1)\left(1 + \frac{1}{\delta}\right)$$

wherein $x_i$ denotes needful resources that have not been changed, and $\delta$ denotes a variable value set according to characteristics of the user terminal, the relaying apparatus, and a channel state between the user terminal and the relaying apparatus.

18. The user terminal of claim 16, wherein the controller determines the decreased needful resources $x_{i2}$ using Equation below:

$$x_{i2}(t) = x_i(t-1)\left(1 - \frac{1}{\delta}\right)$$

wherein $x_i$ denotes needful resources that have not been changed, and $\delta$ denotes a variable value set according to characteristics of the user terminal, the relaying apparatus, and a channel state between the user terminal and the relaying apparatus.

19. The user terminal of claim 13, further comprising a data request control generator generating a data control resource message to be transmitted to the relaying apparatus based on the needful resources determined by the needful resource determiner and the needful resources changed by the controller.

* * * * *